United States Patent
Smith, III et al.

(10) Patent No.: US 9,355,228 B2
(45) Date of Patent: May 31, 2016

(54) SYSTEM AND METHOD FOR POLICY DRIVEN PROTECTION OF REMOTE COMPUTING ENVIRONMENTS

(71) Applicant: Angel Secure Networks, Inc., Old Town, MA (US)

(72) Inventors: Fred Hewitt Smith, III, Old Town, ME (US); Cynthia Smith, Old Town, ME (US); Benjamin Smith, Tucson, AZ (US); Daniel Sabin, Madbury, NH (US)

(73) Assignee: Angel Secure Networks, Inc., Old Town, ME (US)

( * ) Notice: Subject to any disclaimer, the term of this patent is extended or adjusted under 35 U.S.C. 154(b) by 99 days.

(21) Appl. No.: 13/942,319

(22) Filed: Jul. 15, 2013

(65) Prior Publication Data

US 2014/0020049 A1    Jan. 16, 2014

Related U.S. Application Data

(60) Provisional application No. 61/671,673, filed on Jul. 13, 2012, provisional application No. 61/671,675, filed on Jul. 13, 2012, provisional application No. 61/671,676, filed on Jul. 13, 2012.

(51) Int. Cl.
*G06F 21/12* (2013.01)
*G06F 21/55* (2013.01)
*H04L 29/06* (2006.01)

(52) U.S. Cl.
CPC ............ *G06F 21/121* (2013.01); *G06F 21/554* (2013.01); *H04L 63/20* (2013.01)

(58) Field of Classification Search
CPC .................................................... H04L 63/20
See application file for complete search history.

(56) References Cited

U.S. PATENT DOCUMENTS

| 4,408,203 A | 10/1983 | Campbell |
| 4,658,093 A | 4/1987 | Hellman |

(Continued)

FOREIGN PATENT DOCUMENTS

| EP | 0703531 | 3/1996 |
| EP | 0778512 | 6/1997 |

OTHER PUBLICATIONS

"Set Tool Kit for Secure Commerce", Bank Systems +Technology, p. 16, May 1996.

(Continued)

*Primary Examiner* — Yin-Chen Shaw
*Assistant Examiner* — Darshan Dhruv
(74) *Attorney, Agent, or Firm* — Guntin & Gust, PLC; Ralph Trementozzi

(57) ABSTRACT

A system that incorporates teachings of the subject disclosure may include, for example, receiving multiple software agents and configuring a network of the multiple software agents according to a predetermined policy. The process can further include facilitating secure communications among software agents of the network of the multiple software agents according to the predetermined policy. A state of one of the system, a system environment within which the system operates, or a combination thereof can be determined, based on the secure communications among the software agents of the network of the multiple software agents. A computing environment can be facilitated conditionally on the state of the one of the system, the system environment, or the combination thereof, according to the predetermined policy to support a mission application. Other embodiments are disclosed.

18 Claims, 8 Drawing Sheets

(56) References Cited

U.S. PATENT DOCUMENTS

| | | |
|---|---|---|
| 4,696,003 A | 9/1987 | Kerr et al. |
| 4,731,880 A | 3/1988 | Ault et al. |
| 4,809,362 A | 2/1989 | Claus et al. |
| 4,962,498 A | 10/1990 | May |
| 4,999,806 A | 3/1991 | Chernow et al. |
| 5,001,755 A | 3/1991 | Skret |
| 5,005,122 A | 4/1991 | Griffin et al. |
| 5,023,907 A | 6/1991 | Johnson et al. |
| 5,155,847 A | 10/1992 | Kirouac et al. |
| 5,247,683 A | 9/1993 | Holmes et al. |
| 5,301,247 A | 4/1994 | Rasmussen et al. |
| 5,317,744 A | 5/1994 | Harwell et al. |
| 5,388,211 A | 2/1995 | Hornbuckle |
| 5,416,842 A | 5/1995 | Aziz |
| 5,421,009 A | 5/1995 | Platt |
| 5,438,508 A | 8/1995 | Wyman |
| 5,452,415 A | 9/1995 | Hotka |
| 5,461,385 A | 10/1995 | Armstrong |
| 5,495,610 A | 2/1996 | Shing et al. |
| 5,509,070 A | 4/1996 | Schull |
| 5,509,074 A | 4/1996 | Choudhury et al. |
| 5,548,649 A | 8/1996 | Jacobson |
| 5,594,866 A | 1/1997 | Nugent |
| 5,638,512 A | 6/1997 | Osman et al. |
| 5,642,394 A | 6/1997 | Rothschild |
| 5,671,279 A | 9/1997 | Elgamal |
| 5,706,507 A | 1/1998 | Schloss |
| 5,708,709 A | 1/1998 | Rose |
| 5,708,780 A | 1/1998 | Levergood et al. |
| 5,710,883 A | 1/1998 | Hong et al. |
| 5,721,783 A | 2/1998 | Anderson |
| 5,732,275 A | 3/1998 | Kullick et al. |
| 5,737,706 A | 4/1998 | Seazholtz et al. |
| 5,748,896 A | 5/1998 | Daly et al. |
| 5,826,014 A | 10/1998 | Coley et al. |
| 5,864,747 A | 1/1999 | Clark et al. |
| 5,909,589 A | 6/1999 | Parker et al. |
| 5,974,250 A | 10/1999 | Angelo et al. |
| 6,038,666 A | 3/2000 | Hsu |
| 6,067,619 A | 5/2000 | Melvin et al. |
| 6,108,420 A * | 8/2000 | Larose ................ G06F 8/61 380/30 |
| 6,119,186 A | 9/2000 | Watts et al. |
| 6,523,166 B1 | 2/2003 | Mishra et al. |
| 6,636,968 B1* | 10/2003 | Rosner ................ H04L 9/0833 713/178 |
| 6,675,297 B1* | 1/2004 | Ignaszewski ........ G06F 21/62 380/277 |
| 6,995,669 B2 | 2/2006 | Morales |
| 7,019,640 B2 | 3/2006 | Canich |
| 7,030,411 B2 | 4/2006 | Krulevitch |
| 7,162,007 B2 | 1/2007 | Elvan |
| 7,165,484 B2 | 1/2007 | WanQ |
| 7,176,793 B1 | 2/2007 | Hummer |
| 7,180,418 B1 | 2/2007 | Willms |
| 7,181,312 B2 | 2/2007 | Takehara et al. |
| 7,188,513 B2 | 3/2007 | Wilson |
| 7,190,265 B1 | 3/2007 | Bohine |
| 7,191,942 B2 | 3/2007 | Aotekar |
| 7,233,948 B1 | 6/2007 | Shamoon et al. |
| 7,240,015 B1* | 7/2007 | Karmouch ........... G06F 9/4875 705/4 |
| 7,302,698 B1* | 11/2007 | Proudler ............. G06F 21/57 713/187 |
| 8,458,462 B1* | 6/2013 | Hanna .................. H04L 63/10 713/156 |
| 8,719,898 B1 | 5/2014 | Walker et al. |
| 8,726,343 B1 | 5/2014 | Deva et al. |
| 8,769,063 B2 | 7/2014 | Walker et al. |
| 8,793,198 B1* | 7/2014 | Thomas ............... G06N 99/005 706/12 |
| 8,799,994 B2 | 8/2014 | Walker et al. |
| 8,806,570 B2 | 8/2014 | Walker et al. |
| 8,813,179 B1 | 8/2014 | Qureshi et al. |
| 8,849,978 B1 | 9/2014 | Batson et al. |
| 8,849,979 B1 | 9/2014 | Qureshi |
| 8,850,010 B1 | 9/2014 | Qureshi |
| 8,850,049 B1 | 9/2014 | Qureshi |
| 8,850,050 B1 | 9/2014 | Qureshi |
| 8,862,740 B2 | 10/2014 | Joshi |
| 8,869,235 B2 | 10/2014 | Andre et al. |
| 8,881,228 B2 | 11/2014 | Qureshi |
| 8,881,229 B2 | 11/2014 | Walker et al. |
| 8,886,925 B2 | 11/2014 | Qureshi et al. |
| 8,887,230 B2 | 11/2014 | Walker et al. |
| 8,893,221 B2 | 11/2014 | Qureshi |
| 8,898,732 B2 | 11/2014 | Qureshi |
| 8,904,477 B2 | 12/2014 | Walker et al. |
| 8,910,239 B2 | 12/2014 | Walker et al. |
| 8,910,264 B2 | 12/2014 | Qureshi |
| 8,914,845 B2 | 12/2014 | Walker et al. |
| 8,931,078 B2 | 1/2015 | Walker et al. |
| 8,959,579 B2 | 2/2015 | Walker et al. |
| 8,996,709 B2 | 3/2015 | Qureshi |
| 2003/0075608 A1 | 4/2003 | Atherton |
| 2003/0126464 A1 | 7/2003 | McDaniel et al. |
| 2003/0173408 A1 | 9/2003 | Mosher |
| 2003/0196121 A1* | 10/2003 | Raley ................ G06F 21/10 726/21 |
| 2004/0022391 A1* | 2/2004 | O'Brien ............. H04L 9/0822 380/281 |
| 2005/0177271 A1 | 8/2005 | Koren |
| 2005/0225432 A1 | 10/2005 | Lindskog |
| 2008/0010631 A1* | 1/2008 | Harvey ................ G06F 8/36 717/131 |
| 2008/0072241 A1* | 3/2008 | Cohen ................ H04L 67/34 719/317 |
| 2008/0086758 A1* | 4/2008 | Chowdhury et al. ......... 726/2 |
| 2008/0127171 A1* | 5/2008 | Tarassov ............. G06F 8/60 717/174 |
| 2008/0127327 A1* | 5/2008 | Carrasco ............ H04L 63/0272 726/15 |
| 2008/0129493 A1* | 6/2008 | Fuentes .............. G06Q 10/08 340/539.22 |
| 2008/0201705 A1* | 8/2008 | Wookey .............. G06F 8/68 717/175 |
| 2008/0244747 A1* | 10/2008 | Gleichauf et al. ........... 726/25 |
| 2009/0241194 A1* | 9/2009 | Thomas ..................... 726/24 |
| 2010/0257599 A1* | 10/2010 | Gleichauf ................... 726/14 |
| 2011/0231665 A1* | 9/2011 | Wiseman .................. 713/181 |
| 2013/0097597 A1* | 4/2013 | Gibson ............... G06F 8/61 717/177 |

OTHER PUBLICATIONS

"Software Taps Net for Supply Data Sharing", Electronic Buyers News, Section: Purchasing, p. 50, Apr. 22, 1996.

Arnow, "DP: A Library for Building Portable, Reliable Distributed Applications", USENIX Tech Conf, pp. 235-247, Jan. 16-20, 1995.

Baentsch et al., "WebMake: Integrating Distributed Software Development in a Structure-enhanced Web", Computer Networks and ISDN Systems 27, pp. 789-800, 1995.

Bernstein, "Let's Talk: Interapplication Communications in C++ Using X Properties", The X Journal, pp. 37-44, Jan. 2, 1996.

Bryant, "Am I Bid Six? Click to Bid Six!", The New York Times, Section D1, May 13, 1996.

Chii-Ren Tsai et al., Distributed Audit with Secure Remote Procedure Calls, pp. 154-160, XP000300426, Oct. 1991.

Chris Jones, "Licensing Plan Flows from Stream", Infoworld, Section: News, May 6, 1996.

D. Trommer, "ECS Catalog Merges EDI/Net Platforms, Electronic Buyers News", Section: Purchasing, p. 54, May 20, 1996.

Dagenais et al., "LUDE: A Distributed Software Library", USENIX Tech Conf, pp. 25-32, Nov. 1-5, 1993.

DellaFera et al, "The Zephyr Notification Service", USENIX Winter Conference, Feb. 9-12, 1988.

Diane Trommer, "GE/Netscape Form Software Venture", Electronic Buyers News, Section: Online @EBN, p. 54, April 22, 1996.

Eirich, "Beam: A Tool for Flexible Software Update", USENIX Tech Conf, pp. 75-82, Sep. 19-23, 1994.

Ellen Messmer, "Active X Pioneer Pushes Commerce", Network World, p. 33, May 6, 1996.

(56) References Cited

OTHER PUBLICATIONS

Flohr "Electric Money", BYTE, pp. 74-84, 1996.
Hogg "A Photometricity and Extinction Monitor At the Apache Point Observatory," The Astronomical Journal, pp. 2129-2138, 2001.
Lian "Time Delay Modeling and Sample Time Selection for Networked Control Systems," Proceedings of ASME-DSC, vol. XX, pp. 1-8, 2001.
Lodin, "The Corporate Software Bank", USENIX Tech Conf, pp. 33-42, Nov. 1-5, 1993.
M. Takahata et al., Real-Time Video-On-Demand System based on Distributed Servers and an Agent-Oriented Application, vol. 2663, 31 pp. 242-251, Jan. 1996.
Maeda et al., "Service without Servers", IEEE, 4m IEEE Workshop on Workstation Operating Systems, pp. 170-176, Aug. 1, 1993.
Marshall, "Banking on the Internet", Communications Week, p. 1, May 20, 1996.
Messmer, "Edify Software to Let Banks Open Doors Online", Network World, p. 16, May 20, 1996.
Messmer, "Start-up puts security Socks on Windows apps", NE, 39, May 20, 1996.
Michael B. Jones, "Interposition Agents: Transparently Interposing User Code at the System Interface", 14th ACM Symposium on Operating Systems Principals, pp. 80-93, 1993.
Nachbar, "When Network File Systems Aren't Enough: Automatic Software Distribution Revisited", USENIX Tech. Conf., pp. 159-171, Summer 1986.
Nash et al., "Vendors Deliver IS-specific apps over the 'net", Computer World, Section: News, p. 16, May 6, 1996.
Noble et al., "A Programming Interface for Application-Aware Adaptation in Mobile Computing", USENIX Association, vol. 8, No. 4, pp. 345-363, Fall 1995.
One Click Software Via the Web, DATAMATION, p. 16, May 1, 1995.
Ozer, Online Software Stores, PC Magazine, Section: Trends, p. 36, May 28, 1996.
Rodriguez, "Pushing the Envelope", Communications Week, Section: Internet/ Internet, p. 37, May 31, 1996.
Rupley, "Digital Bucks? Stop Here", PC Magazine, Section: First Looks, p. 54, May 28, 1996.
Semilof, "Boosting Web Business", Communications Week, Section: News Brief, p. 31, May 20, 1996.
Silwa, "Netscape Unveils New 'New Commerce Offerings", Networld World, Section: Internet News, p. 10, May 13, 1996.
Smalley et al., "A security Policy Configuration for the Security-Enhanced Linux", pp. 1-20, Feb. 2001.
Stream International Inc., Stream, LitleNet, BBN, and KPMG Announce Industry-Wide Initiative to Enable Wide-Scale Software Electronic Commerce, http://www.stream.com, May 12, 1996.
Tim Clark, "The Big Sell, Software Online", Inter@ctive Week, pp. 31-35, Apr. 22, 1996.
Turnoff et al, "An Electronic Information Marketplace", North Holland Computer Networks and ISDN Systems 9, pp. 79-90, 1985.
Wexler, "AT&T Sells Insurers on the Web", Network World, p. 27, May 20, 1996.
Wong, "Local Disk Depot-Customizing the Software Environment", USENIX Tech Conf, pp. 51-55, Nov. 1-5, 1993.
Yamada et al, "Electronic Distribution Program on tap", Computer Reseller News, pp. 1 and 169, Apr. 29, 1996.
US 5,748,741, 05/1998, Johnson et al. (withdrawn)

\* cited by examiner

300

500

700

SYSTEM AND METHOD FOR POLICY DRIVEN PROTECTION OF REMOTE COMPUTING ENVIRONMENTS

PRIOR APPLICATIONS

The present application claims the benefit of priority to U.S. Provisional Application No. 61/671,673, filed on Jul. 13, 2012, entitled "Secure Control Logic for Computing Environments."

The present application claims the benefit of priority to U.S. Provisional Application No. 61/671,675, filed on Jul. 13, 2012, entitled "Simultaneous Installation of Software on Vehicle and Control Station."

The present application also claims the benefit of priority to U.S. Provisional Application No. 61/671,676, filed on Jul. 13, 2012, entitled "Audit of Remote Computing Environments."

All sections of the aforementioned applications are incorporated herein by reference in their entirety.

RELATED APPLICATIONS

U.S. patent application Ser. No. 08/689,767, filed Aug. 13, 1996, by Benjamin H. Smith et al., entitled "System for Installing Information Related to a Software Application to a Remote Computer Over a Network," now U.S. Pat. No. 6,067,582.

U.S. patent application Ser. No. 09/441,403, filed Nov. 16, 1999, by Benjamin H. Smith et al., entitled "System for Installing Information Related to a Software Application to a Remote Computer Over a Network," now U.S. Pat. No. 6,918,038.

U.S. patent application Ser. No. 09/500,883, filed Feb. 9, 2000, by Benjamin H. Smith et al., entitled "System for Installing Information Related to a Software Application to a Remote Computer Over a Network," now U.S. Pat. No. 6,532,543.

U.S. patent application Ser. No. 10/600,738, filed Jun. 20, 2003, by Fred Hewitt Smith et al., entitled "Secure Detection Network System," now U.S. Pat. No. 7,475,428.

U.S. patent application Ser. No. 12/277,100, filed Nov. 24, 2008, by Fred Hewitt Smith et al., entitled "Secure Detection Network System," now U.S. Pat. No. 7,930,761.

U.S. patent application Ser. No. 13/088,824, filed Apr. 18, 2011, by Fred Hewitt Smith et al., entitled "Secure Detection Network System."

U.S. patent application Ser. No. 11/724,879, filed Mar. 15, 2007, by Fred Hewitt Smith, entitled "Secure Panel with Remotely Controlled Embedded Devices," now U.S. Pat. No. 7,576,653.

U.S. patent application Ser. No. 11/178,527, filed Jul. 11, 2005, by Fred Hewitt Smith, entitled "System and Method for Defending Against Reverse Engineering of Software, Firmware and Hardware," now U.S. Pat. No. 7,841,009.

U.S. patent application Ser. No. 12/150,373, filed Apr. 28, 2008, by Fred Hewitt Smith, entitled "System and Methods for Defending Against Root," now U.S. Pat. No. 8,336,107.

U.S. patent application Ser. No. 12/837,540, filed Jul. 16, 2010, by Fred Hewitt Smith, entitled "Protecting Information in an Untethered Asset."

U.S. patent application Ser. No. 12/596,967, filed May 10, 2010, by Charles T. Hess et al., entitled "Container Security Devices, Systems, and Method."

U.S. patent application Ser. No. 12/358,132, filed Jan. 22, 2009, by Fred Hewitt Smith, entitled "Container with Interior Enclosure of Composite Material Having Embedded Security Element," now U.S. Pat. No. 8,344,885.

U.S. patent application Ser. No. 13/410,257, filed Ser. No. 13/410,257, by Fred Hewitt Smith, entitled "Polymorphic Assured Network."

All sections of the aforementioned applications are incorporated herein by reference in their entirety.

FIELD OF THE DISCLOSURE

The subject disclosure relates to a system and method for policy driven protection of remote computing environments.

BACKGROUND

Remote installation of software is common in the context of commercial computing. For example, it is a routine matter for software and system vendors, such as Microsoft®, Adobe® and Apple® to remotely install updates, sometimes referred to as "patches" for their products running on consumer platforms, such as personal computers, workstations, tablet computers and smart phones. Some devices, such as smart phones routinely recharge their batteries when placed in a cradle, allowing software vendors to install software upgrades while the smart phone is resting in the cradle, even when the device is not in use.

In some instances, such software upgrades can occur automatically, e.g., without user interaction or approval. For example, a user may pre-authorize software updates from one or more authorized software vendors for certain applications, e.g., operating systems or security software. In other instances, the availability of such updates can be determined and presented to a user without updating the software automatically. Rather, installation of any of the available software upgrades can be accomplished in response to user authorization, which can be provided, e.g., on a case-by-case basis.

Anyone with a smart phone or personal computer running any of the popular operating systems or security software is accustomed to the frequent occurrence of such software updates. It would not be unusual to expect several software updates per week, e.g., for a smartphone hosting a modest number of applications. In order to make such software updates minimally invasive or otherwise unnoticeable to a user, a user's data files are typically not removed or otherwise modified. For example, a user configuration file, data files, and the like, will remain substantially unchanged on the device being updated. Such frequent software upgrades are less common in sensitive applications, such as in a military applications due to security concerns. Namely, each modification to software and/or data on a sensitive platform poses an opportunity for the introduction of malware, spyware, and the like.

BRIEF DESCRIPTION OF THE DRAWINGS

Reference will now be made to the accompanying drawings, which are not necessarily drawn to scale, and wherein.

DETAILED DESCRIPTION

Figure 1:
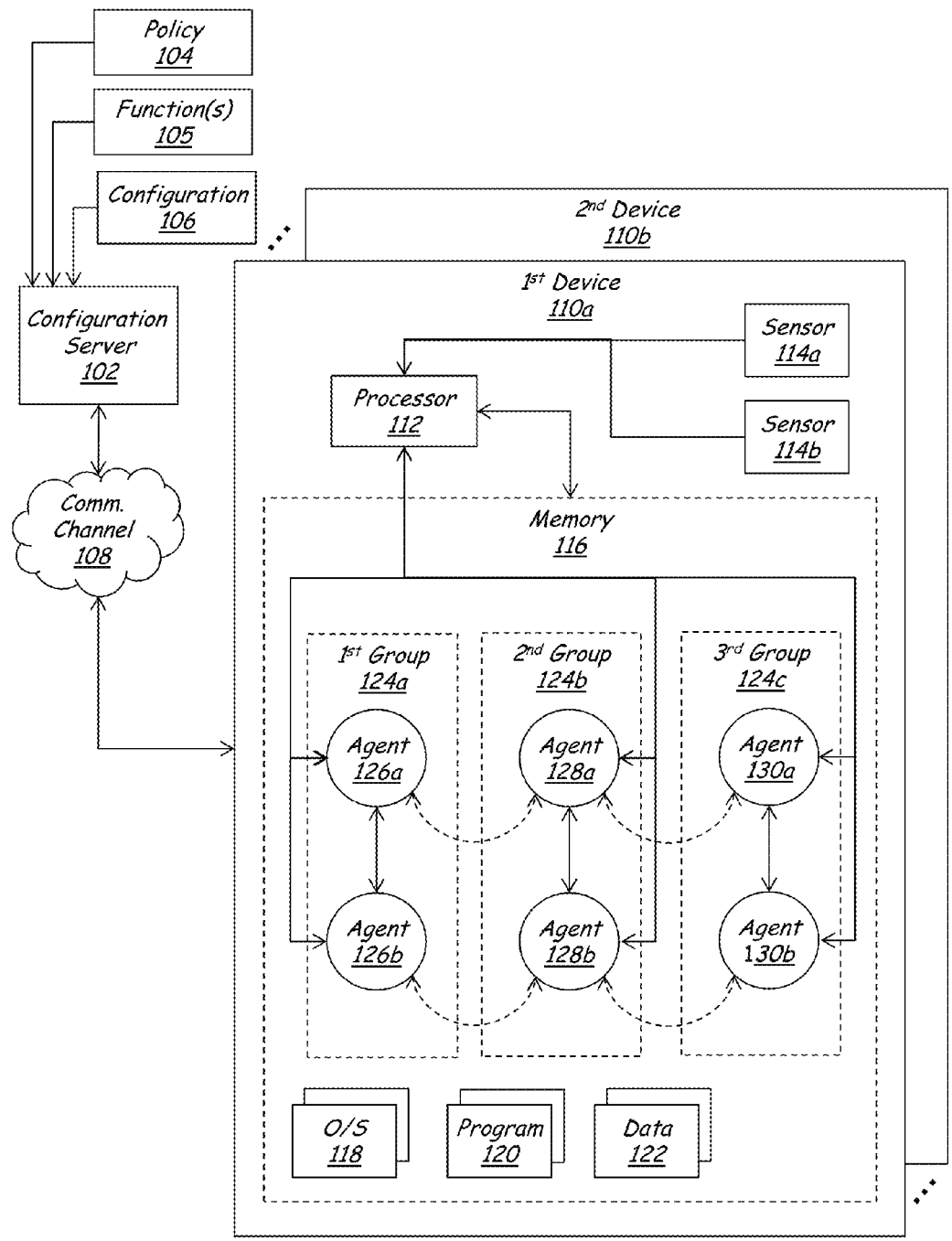
FIG. 1 depicts an illustrative embodiment of a securable remote processing environment.

The subject disclosure describes, among other things, illustrative embodiments of policy driven protection of remotely operated computing environments. Other embodiments are included in the subject disclosure.

One embodiment of the subject disclosure includes a process that includes receiving, by a system including a processor, multiple software agents, and configuring, by the system, a network of the multiple software agents according to a predetermined policy. The process further includes facilitating, by the system, secure communications among software agents of the network of the multiple software agents according to the predetermined policy, and determining, by the system, a state of one of the system, a system environment within which the system operates, or a combination thereof, based on the secure communications among the software agents of the network of the multiple software agents. A computing environment is facilitated by the system to support a mission application. The facilitating of the computing environment is conditional on the state of the one of the system, the system environment, or the combination thereof, according to the predetermined policy.

Another embodiment of the subject disclosure includes a system, including a memory to store instructions and a processor in communication with the memory. The processor, responsive to executing the instructions, performs operations including receiving multiple software agents and configuring a network of the multiple software agents according to a predetermined policy. The processor further performs operations including facilitating secure communications among software agents of the network of the multiple software agents, and determining a state of one of the system, a system environment within which the system operates, or a combination thereof, based on the secure communications among the software agents of the network of the multiple software agents according to the predetermined policy. A computing environment is facilitated to support a mission application. The facilitating of the computing environment is conditional on the state of the one of the system, the system environment, or the combination thereof, according to the predetermined policy.

Yet another embodiment of the subject disclosure includes a process, including implementing a predetermined policy and sending, by a system including a processor, multiple software agents to a first device. The multiple software agents, when installed upon the first device according to the predetermined policy, cause the first device to perform operations. The operations performed by the first device include configuring a network of the multiple software agents according to the predetermined policy, and facilitating secure communications among software agents of the network of the multiple software agents according to the predetermined policy. The operations performed by the first device further include determining a state of one of the first device, an environment within which the first device operates, or a combination thereof, based on the secure communications among the software agents of the plurality of software agents and facilitating a computing environment to support a mission application. The facilitating of the computing environment is conditional on the state of one of the first device, the respective environment, or a combination thereof, according to the predetermined policy.

The techniques disclosed herein relate generally to the protection of computing environments and more particularly to the protection of remote computing environments that include a controllable platform and a controller to remotely control the controllable platform. One or more of the controllable platform, the controller or a combined control system of the controlled platform and the controller, include one or more applications, sometimes referred to herein as mission applications. The applications can include communication between one or more elements or components, such as circuit boards, modules, processes or combinations thereof of the controllable platform, the controller or the combined control system that communicate with the control module. By way of non-limiting example, such control systems can include industrial processes, e.g., in association with manufacturing and/or supply chain applications, e-commerce applications, and control systems in which the controllable platform is a mobile platform. Some examples of mobile platforms include robots, automobiles, which can be controlled remotely, piloted aircraft which communicate with remote controllers, and unpiloted aircraft (drones), both military and civilian, which communicate with remote controllers. More generally, the techniques disclosed herein apply to securable remote computing environments in which elements communicate with one another over one or more communication channels, e.g., in which network connections of such communication channels can be predefined.

FIG. 1 depicts an illustrative embodiment of a system 100 implanting policy driven protection of a remote computing environment. The system 100 includes a system configuration server 102, a policy definition file 104, one or more function definitions 105 and other information, such as a configuration file 106. The configuration server 102 is in communication with a first device 110a by way of a communication channel 108. The first device 110a, in turn, includes at least one processor 112 and one or more sensors 114a, 114b (generally 114). The first device 110a also includes a memory 116. The memory 116 can be configured to store one or more operating systems 118, one or more programs, e.g., application programs 120, and one or more other data structures 122, such as data files, including image files, sound files and the like.

In operation, the system configuration server 102 obtains policy information from the policy definition file 104 and configuration information from the configuration file 106. Policy information can also be included in one or more files of functions, which are run on the system 100 by installed software agents. The policy information causes the installed software agents to examine the system and in at least some instances, to provide cryptographic material based the results of their examinations. The system configuration server 102 sends information to the first device 110a to cause generation of a network of software agents, at least some of which can reside on the first device 110a. In the illustrative example, the configuration server 102 sends information causing the generation of a first networked group of software agents 124a, including a first software agent 126a and a second software agent 126b. The first networked group of software agents 124a is configured to support secure communications between the first and second software agents 126a, 126b. The first networked group of software agents 124a can be configured to perform one or more tasks, such as determining an encryption key, e.g., for decrypting sensitive information. The sensitive information can represent one or more of the operating system 118, the application programs 120 or the data structures 122. The sensitive information can originally reside in the memory 116 prior to generation of the first networked group of software agents 124a, or be provided from another source, such as the configuration server 102 before, after, or at the time of generation of the first networked group of software agents 124.

The software agents are computer programs configured to achieve one or more objectives. The software agents that can include one or more attributes of artificial intelligence, e.g., exhibiting some aspects of learning and/or reasoning. Alternatively or in addition, the software agents are computer programs that can include one or more attributes of autonomy, e.g., capable of modifying a manner in which they achieve their objectives. The software agents can be distributed, e.g., being executed on one or more of the same processor, different processors of the same computer, and/or physically distinct computers or processors. In at least some of the embodiments disclosed herein the software agents are configured in multi-agent systems, including distributed agents that do not necessarily have capabilities to achieve an objective alone. Such distributed agents can be arranged into the networks of software agents disclosed herein to facilitate communication among two or more software agents of the networks of software agents.

In at least some embodiment, one or more of the software agents 126a, 126b receives sensor information from one or more of the sensors 114a, 114b. The sensor information can provide information obtained from or otherwise indicative of the first device 110a. Alternatively or in addition, the sensor information can provide information obtained from or otherwise indicative of an environment within which the first device 110a is operating. According to one or more of the policy definition file 104 and the configuration file 106, one or more of the software agents 126a, 126b implements a respective function 105 based upon at least a portion of the sensor information. By way of illustration, a system designer can determine an authorized environment within which the first device 110a is authorized to operate. The authorized environment can have one or more aspects that are detectable by way of sensory information obtained by one or more of the sensors 114a, 114b. The system designer determines which sensor information from one or more of the sensors 114a, 114b is suitable for arriving at a determination that the first device 110a is operating in an authorized environment and what values or range of values represent positive results indicative of the authorized environment. The one or more functions 105 implemented by the software agents 126a, 126b can provide a result indicative of an authorized environment in response to sensor data indicative of the authorized environment. Such a successful determination can be used to allow one or more of the software agents 126a, 126b to perform one or more other functions.

In an illustrative example, the software agents 126a, 126b include functionality to produce a decryption key to allow for decryption of encrypted sensitive information. Alternatively or in addition, the software agents 126a, 126b install one or more of the operating system 118, the application programs 120 and the data structures 122. By way of illustrative example, the software agents 126a, 126b allow for an installation process, e.g., an application program 120 running on the first device 110a, and/or a similar process running on the configuration server 102. The installation process can re-image the $1^{st}$ device, e.g., by re-imaging at least a first operating system 118. The operating system 118 can include operating system function(s) and supporting file structure sufficient to proceed with normal operations, or a simplified version, e.g., a kernel, requiring further enhancements before normal operations are possible.

According to the policy information file 104 and configuration information from the configuration file 106 and various functions 105, the system configuration server 102 sends further information to the first device 110a to cause generation of a second network of software agents 124b, including a first software agent 128a and a second software agent 128b. The second networked group of software agents 124b can also be configured to support secure communications between the first and second software agents 128a, 128b. The second networked group of software agents 124b can be configured to perform one or more of determining another encryption key, e.g., for decrypting further sensitive information. The further sensitive information can represent one or more of enhancements to the operating system 118 installed or otherwise configured by way of the first group of software agents 124a, the application programs 120 and/or the data structures 122. Alternatively or in addition, the further sensitive information can represent one or more of application programs 120. In at least some embodiments, the process can be repeated again, e.g., producing a third networked group of software agents 124c, including a first software agent 130a and a second software agent 130b. In some embodiments the first networked group of software agents 124a can be removed or otherwise rendered inoperable before installing the second networked group of software agents 124b, and the second networked group of software agents 124b can be removed or otherwise rendered inoperable before installing the third networked group of software agents 124c. Thus, only one of the networked groups of software agents is operable at any given time. Alternatively, the first networked group of software agents 124a is not removed of otherwise rendered inoperable before installing the second and/or third networked groups of software agents 124b, 124c, such that more than one of the networked group of software agents 124a, 124b, 124c can be operable at the same time.

In at least some of the embodiments, one or more of the first, second and third networked groups of software agents 124a, 124b, 124c can be configured, e.g., according to the policy, to periodically monitor the sensor data. The expected sensor data, as identified in one or more of the policy file 104 or the configuration file 106 can include expected environmental conditions that vary, e.g., according to a particular mission. Thus, it is conceivable that appropriate environmental conditions may vary over the course of a particular mission. The groups of software agents 124a, 124b, 124c can be configured to periodically monitor sensors and take action conditionally in response to the updated sensor data.

A characteristic configuration of the networked software agents 124a, 124b, 124c is that the first device 110a, e.g., a controllable platform or process, such as a vehicle, has an embedded operating system 118 that receives input from one or more sensors 114, as shown an described above. The sensors 114 can also be embedded within the first device 110a and otherwise adapted to receive information from one or more of the process, e.g., the device 110a itself, and from a local environment of the device 110a, referred to generally as a surrounding environment.

In at least some embodiments, the controllable platform or process of the first device 110a is capable of communicating with another remote device, such as a remote server. The remote server can be configured as a remote monitor, e.g., adapted to send instructions to the controllable platform or process and/or to monitor processing and/or mission progress of the first device 110a.

One or more of a controller or the controllable platform or process of the first device 110a can be adapted to contain sensitive information, referred to generally as sensitive technology. It is understood that such sensitive technology should remain confidential, even if one or more of the controller or the controllable platform or process were to fall into the hands of an unintended recipient. Thus, the sensitive technology should not be maintained in an unprotected state for any substantial period of time. In at least some embodiments, such sensitive information is encrypted or otherwise obfuscated until needed, in preparation for, during, or after completion of a mission.

A particular challenge addressed by the techniques disclosed herein is that the controllable platform or process of the first device 110a can communicate with a second device 110b, such as the remote monitor before, during or after a given mission. In at least some embodiments, the second device 110b is configured similar to the first device 110b, understanding that one or more of the operating system, application programs or data structures may differ from the first device 110a, as a matter of course.

Communications between a controllable platform or process of the first device 110a and one or more of the remote monitor or a remote controller of the second device 110b can occur on any suitable communication mode, such as the communication channel 108 of FIG. 1, or a separate communication channel (not shown). Examples of such communication modes include wired communications, wireless communications, e.g., radio communications, free-space optical communications, guided wave optical communications, and acoustic wave communications. Other examples of such communication modes include wide area networks, such as the Internet, regional or metro communication networks, campus communication networks, local area networks, personal area networks and the like. Still other examples of such communication modes include satellite communication networks, terrestrial radio communication networks, such as cellular radio networks, cable communication networks, fiber-optic communication networks, and telecommunication networks, including plain old telephone service (POTS).

Any of these communication modes can be used alone or in combination with others. It is understood that one or more components of such communication channels 108 or modes can be unguarded, e.g., public, thereby introducing a risk that the controllable platform or process can be monitored or even taken over by unintended entities or individuals. Under such circumstances, it is likely that any sensitive technology embedded in one or more of the controllable platform or process or the remote controller or monitor can be accessed without proper authorization or otherwise stolen. Such a compromise would likely jeopardize a mission. Even worse, a capture of the controllable platform or process might allow it to be used by an adversary, a competitor, or a disturbing party for nefarious purposes, such as an attack on one's business, or physical premises, including targets both military and civilian.

According to the policy-driven techniques disclosed herein to protect such computing environments from compromise, any embedded sensitive technology as might otherwise be obtained by capture and reverse engineering can be protected. One such approach includes installation of one or more of the operating system 118 and software 120 nearly simultaneously on both the controllable platform or process and the controller. Such operating system and other software can be provided from a remote source prior to start of mission. In particular, such remote provisioning of operating systems and other software can be accomplished just-in-time with respect to a mission.

Anticipating missions with multiple phases, it is understood that one or more of the operating systems 118 and other software 120 can be installed on one or more of the controllable platform or process of the first device 110a, or the controller of the second device 110b prior to, e.g., just-in-time, with respect to a particular phase of a mission. Thus, a control system including a mission profile having a preliminary phase and a terminal phase may load one or more of the operating system 118 and other software 120 related to the initial phase just prior to the initial phase, without necessarily loading one or more of the operating system 118 and other software 120 related to the terminal phase. In the illustrative example, one or more of the operating system and the other software related to the terminal phase can be loaded during execution of, and/or after completion of the initial phase.

At least some of the techniques disclosed herein include the use of agent technology. Such agent technology can be used, e.g., to examine a controllable platform or process and a remote controller before installation of protection software and application software. In at least some embodiments, such agent technology can be used to provide continued examination of one or more of the controllable platform or process of the first device 110a or the remote controller of the second device 110b, while one or more mission applications on one or more of the controllable platform or process of the first device 110a, or the remote controller of the second device 110b are executing.

In some cases, the intelligent software agents operate entirely at the software level. In other cases, the intelligent software agents interact with hardware, such as physical sensors. Examples of sensors include, without limitation, one or more of environmental sensors, biological sensors, and more generally physical sensors and/or software sensors or monitors used to monitor application. The software or sensors that can detection values from the mission scenario, software and sensors that can detect unique characteristics of the hardware environment to prevent software from being executed in a falsified virtual environment, Environmental sensors include, without limitation, temperature sensors, humidity sensors, light sensors, position sensors, orientation sensors, altitude sensors, and motion sensors including one or more of speed or acceleration. Biological sensors include, without limitation, blood pressure sensors, blood oximeter sensors, electrical conductivity sensors, pulse rate sensors, image sensors, retinal scan sensors, finger print sensors, and the like. The system of installed software agents also is able to detect attacks and unauthorized activity. The software agents can be configured to check on one another. For example, one agent can determine if another agent is slow in responding or otherwise not available. Such indications might indicate unauthorized activity such as the presence of a debugger or an attempt to execute the software in an unauthorized environment or an attempt to execute individual software agents when the entire network of software agents is not running.

In at least some embodiments, intelligent software agents can be configured to perform collaborative tasks, e.g., by functioning in, so-called, "chains." In a chain, multiple intelligent software agents work together to perform a specific task. Examples of such chains are disclosed, e.g., in commonly owned U.S. Pat. No. 7,841,009, entitled "System and Method for Defending Against Reverse Engineering of Software, Firmware and Hardware," the entire contents of which are incorporated herein by reference in its entirety. In the present disclosure, the chains of intelligent software agents are configured to include one or more functions 105 in FIG. 1. The functions can be prepared by a system design team and imposed or otherwise implemented, e.g., according to a predefined policy. For example, one or more of the functions can be configured to expect one or more values. Such values can be expressed as a particular value, e.g., a number, or as a range of values. In operation, if a function returns a value that is out of range, the chain can continue to execute without indicating to an observer that such an out of range result was obtained. In one embodiment, a function testing for a scenario, environmental or system value that falls within a range, produces cryptographic values with high entropy using a hash or other such technology. For example, a chain configured to produce cryptographic material, such as an encryption and/or decryption key, still produces a key, although the key will not decrypt its target object. Such an approach complicates attempts at reverse engineering and/or unauthorized attempts to access features of the system, such as sensitive information.

Sensitive technologies, sometimes referred to as sensitive or critical technologies, e.g., depending upon a particular mission or application, can be—made very difficult to obtain by encryption with appropriate algorithms and keys. Policy can be embedded in one or more elements of the control system to examine one or more of the mission application and local environments, while the applications executes. A so-called "safe" environment can be identified by policy, such that sensitive information related to a mission or application can be conditioned upon a belief or conclusion of the environment is safe. Thus, if the examination reveals that the application is operating in a safe environment, the sensitive technology can be decrypted and executed; otherwise, the critical technology is not decrypted. If a system safety state changes from safe to unsafe as defined by the embedded policy, any unencrypted, e.g., "clear text" instances of the sensitive technology are deleted and/or otherwise destroyed. In at least some embodiments, a penalty can be imposed, e.g., in response to a determination that the system state is unsafe, so that the sensitive technology can never be decrypted. In some embodiments, this penalty can be covertly imposed, so that an adversary attempting to reverse engineer the system does not immediately realize that the task of obtaining a correct key has been rendered impossible.

Figure 2A:
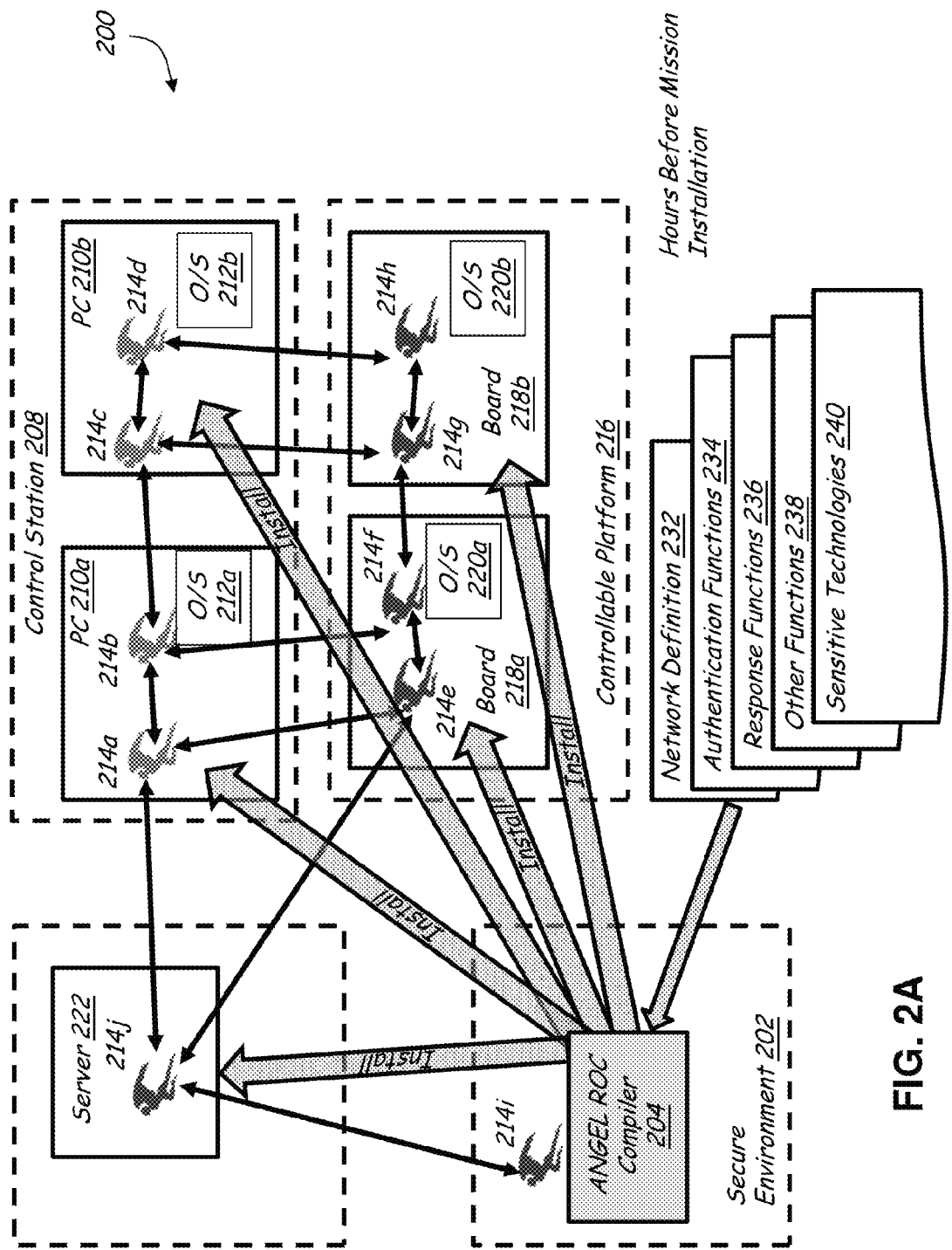
FIG. 2A and FIG. 2B depicts an illustrative embodiment of a remote control system applying the securable remote processing environment of FIG. 1.

FIG. 2A depicts a functional block diagram of an example of a system 200 including a controllable platform or process 200 and a remote control station 202. Policy is input to a configuration server 204, e.g., a random obfuscating compiler (ROC), through a network definition file and various functions that the network will execute. Sensitive technology is also input to the ROC by way of the configuration server 204. The configuration server 204 also accesses one or more policy documents and functions and the selection of critical technology are under the control of the system design team. The configuration server 204 then produces a first installed network of software agents. The software agents are referred to herein as nodes of the installed network of software agents. Some nodes are installed on the controllable platform or process; other nodes are installed on the controller. The nodes communicate with one another as shown by the thin lines with double arrows, although it is not necessary that all communications are bidirectional. Some communications can be unidirectional.

The control system 200 includes a control station 208 including at least one workstation or personal computer (PC). In the illustrative example, the control station 208 includes a first PC 210a and a second PC 210b. Each of the PCs 210a, 210b includes a respective embedded operating system 212a, 212b. The first PC 210a includes at least one software agent. In the illustrative example, the first PC 210a includes a first software agent 214a and a second software agent 214b. Likewise, the second PC 210b includes a first software agent 214c and a second software agent 214d.

The control system 200 also includes a controllable platform or process 216 including a first board or module 218a and a second board or module 218b. Each of the modules 218a, 218b includes a respective embedded operating system 220a, 220b. The first module 218a includes a first software agent 214e and a second software agent 214f. Likewise, the second module 218b includes a first software agent 214g and a second software agent 214h. In the illustrative embodiment a secure environment 206 including the configuration server 204 also includes a software agent 214i, and a remote server 222 includes yet another software agent 214j.

A series of thick arrows marked Install extend from the configuration server to each of the PCs 210a, 210b of the control station 208, each of the modules or boards 218a, 218b of the controllable platform 216 and the server 222 These arrows identify that, during installation of the software agent network that protects the controlled process the configuration server 204 installs all of the software to the control station 208, the controllable platform 216 and the server 222, including the operating systems 212a, 212b, 220a, 220b and the software to implement functionality of the controllable platform 216 and the control station 208.

As with installation of all operating systems, the installation process can proceed through multiple stages, starting with installation of a temporary small operating system and proceeding through using small operating system to install the complete operating system and applications that run on it. However, the installation process depends on the hardware and the circumstances and the policy as to whether everything should be installed.

As with installation of operating systems, installation of networks of software agents can also proceed through several stages, which involve initial examination of the respective environment (e.g., each of the control station environment and the controllable platform environment), running a special software agent network designed to develop cryptographic keys according to sensory information obtained from the respective environments and mission scenario (e.g., speed and/or location of the controllable platform during each phase of the mission). In the illustrative example, a network of software agents 214a, 214b, 214c, 214d, 214e, 214f, 214g, 214h, 214i, 214j (generally 214) is installed and configured along with operating systems 212a, 212b, 220a, 220b and application software for the respective target environments.

Figure 2B:
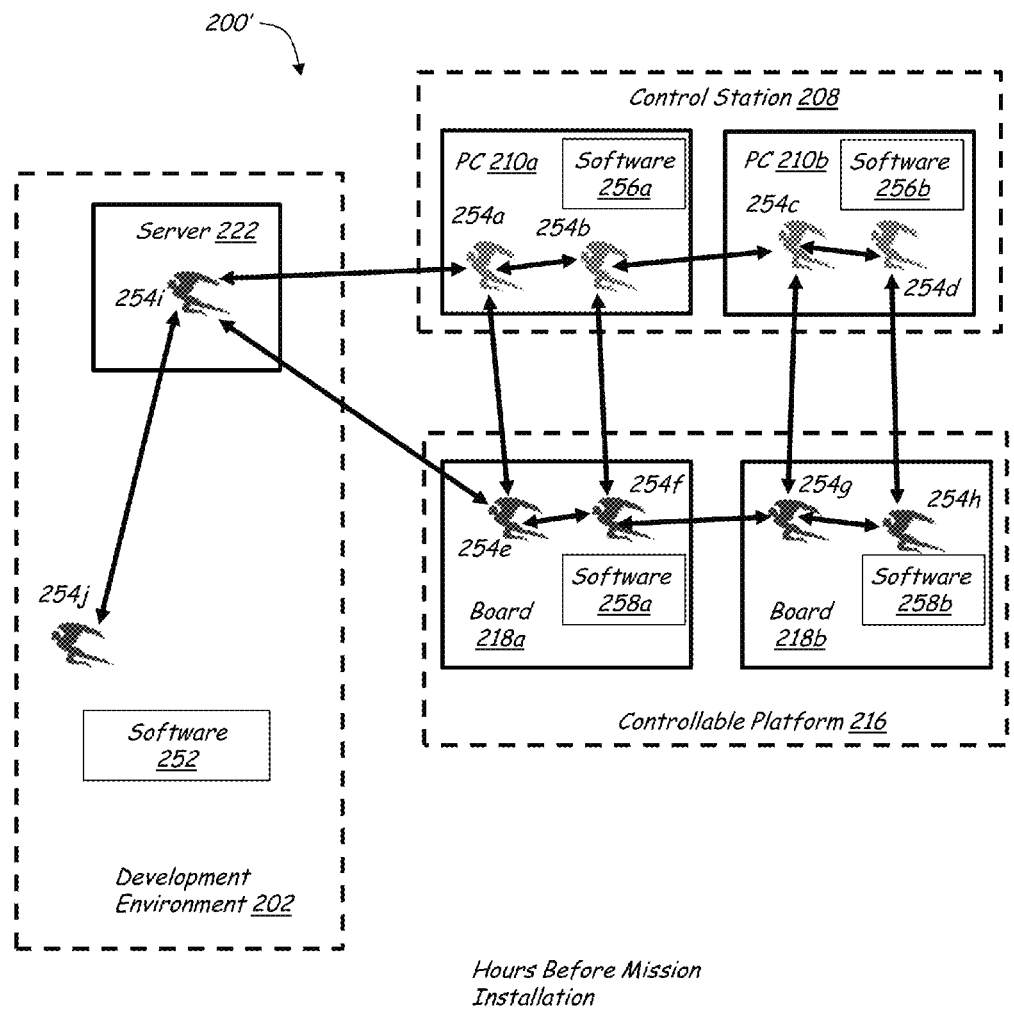

FIG. 2B depicts an embodiment of the control system 200' using other software agents to install additional software and conduct examinations. For example, the network of software agents 214 (FIG. 1) can be used to install the operation systems 212a, 212b, 220a, 220b, as described above. An updated or otherwise modified network of software agents can be initialized or otherwise configured. In the illustrative example, the first PC 210a includes a first software agent 254a and a second software agent 254b, the second PC 210b includes a first software agent 254c and a second software agent 254d. Likewise, the first module 218a of the controllable platform 216 includes a first software agent 254e and a second software agent 254f and a the second module 218b includes a first software agent 254g and a second software agent 254h. The server 222 includes a software agent 254i and software 252 of the development environment 202 is associated with a software agent 254j. The software agents 254a through 254j (generally 254) represent the updated/modified software agent network.

In the illustrative example, the second software agent network 254 can be used to initialize or otherwise install software 256a on the first PC 210a, software 256b on the second PC 210b, software 258a on the first module 218a and software 258b on the second module 218b. Installation of the software, according to the techniques disclosed herein can include one or more of generation of encryption keys, or installation and/or execution of the software by way of the software agent network 254 according to the predetermined policy and/or configuration information.

The area of applicability concerns policy-driven protection of computing environments which consist of a controlled process and a controller. Such environments can include industrial processes and their controllers, automobile and remote controllers that communicate with the automobiles over the Internet; modern piloted airplane software that communicates with a remote controller, and military and civilian unpiloted aircraft.

Generally speaking, the techniques disclosed herein refer to a generic design for a network of software agents in which some software agents are installed on a platform (e.g., drone, automobile, aircraft) or a controlled process; whereas, some are installed on a controller used in control of the platform. In at least some embodiments such installation occurs within a relatively short period of time, referred to as a time delay threshold. An example time delay threshold can be measured in seconds, or perhaps minutes, but generally not more than a few hours. In at least some embodiments, the software agents are installed automatically, and "right before" or "just in time" before" a "mission," that is an occasion when the controller will be used to control the controllable platform or process.

According to the techniques disclosed herein, the agent technology can be used in various commercial and military scenarios to provide frequent software installation in a manner that would provide a very powerful level of security that is otherwise unobtainable. By way of example, the Android® operating system user community admits that completely reinstalling all software on a device provides very powerful security. See, e.g., online information available at www.windowsreinstallguide.com and www.droidlessons.com/how-to-factory-reset-your-android-device.

However, the commercial community in its software installation activities often operates under several severely restrictive conditions that might not be present in a certain commercial contexts and military contexts. In the commercial community, at least in the consumer electronics community, there is a requirement to preserve a customer's personal data, which is the reason that a complete reinstallation is an infrequent and cumbersome occurrence. The customer generally backs up his or her data before a reinstallation—a tedious procedure that subjects the customer to a significant inconvenience. A remote re-installer that attempts a backup of customer data, would require the re-installer to distinguish between legitimate customer data and hidden malware, which is very difficult. It would also defeat a major purpose of the reinstallation, which is to remove, with a high level of certain, all hidden malware.

In a military context, a drone might have surveillance data that was gathered during a mission, which will be removed after a mission (or communicated to the monitor during the course of the mission in many cases) and analyzed. But the drone has no "personal" data apart from its known mission data. Consequently, a drone could be reimaged after a mission, assuming that the equipment and procedures were available to do so, and that proper security procedures were available. Thus, the personal data protection restriction does not apply. Similarly, many industrial processes can transfer their important data to a remote server and afterward have no personal data that cannot be overwritten. These processes can be wiped clean and reimaged. Thus, software, e.g., including operating systems, can be re-installed or otherwise re-imaged on a periodic basis, e.g., daily or weekly.

If just-in-time installation is feasible in a particular context, the techniques disclosed herein can be used to install a network of software agents throughout the system, while at the same time reinstalling all or some of the operational software for the underlying system.

Consequently, a generic system, such as shown in FIG. 2A-2B includes a compiler running in a development environment 202 that installs operating systems 212a, 212b, 220a, 220b and software agents 214, 254 on an installation server 222 and on various components of a control station 208 and a controllable platform 216. The installation server 222 and the development environment 202 can be located in a secure environment. The environment for the control station and the drone need not be secure, or at least not as secure as the secure development environment 202. Thus, in at least some embodiments, the installation process completely reimages the target hardware and installs the operating system, the network of software agents, and the software required to operate controller and the controlled process.

The software agents 214, 254 initialize secure communication channels with one another and check out the environments in which they have been installed, both during the installation process and when the controller and controlled process are operating. The software agents 214, 254 also communicate with the underlying application software 256a, 256b, 258a, 258b and provide sensitive technology to the underlying software applications if the environment and the scenario are determined to be "safe", e.g., as defined in the policy developed by the system design team and installed in the network of software agents 214, 254.

It is envisioned that the entire procedure that could be accomplished in perhaps an hour or two, or less, depending on the complexity of the target controller and controlled process.

At least some advantages of the techniques disclosed herein include that the controlled process and the controller contain only software provided from the development environment, just-in-time for this mission. All software agents 214, 254 (and other elements that communicate over the network) could have cryptographic keys to communicate with one another that have just been installed, so that initial communication would not require any sort of asymmetric key exchange. Inappropriate software that might have been downloaded, e.g., from the Internet by one or more of the control station 208 and the controllable platform 216, would be removed. Malware and root kits that might have loaded onto the control station 208 and the controllable platform 216 would necessarily be removed. The installation would occur automatically from the development environment based on a network definition file, so there would be minimal opportunity for malicious interference or careless error.

Depending on the circumstances, the network of software agents 214, 254 could be deleted after installation. In this use, the network of software agents 214, 254 would assure a secure complete reimaging of the target system. Alternatively or in addition, the network of software agents 214, 254 could be used as an anti-tamper system and provide protection of the sensitive technology located on the system by making available the sensitive technology when required if the system 200 is in a "safe" state, "safe" being defined by the file definition used to create the network. Additionally, the network of software agents 214, 254 can be configured to destroy the sensitive technology if the environment changes, e.g., from a "safe" state to an "unsafe" state. Alternatively or in addition, the network of software agents 214, 254 can be configured to effectively "poison" the system so that the sensitive technology can never be recovered if the environment becomes unsafe. Still further, the techniques disclosed herein can be used to defend the sensitive technology in circumstances in which the controllable platform 216 has lost communication with the control station 208 (e.g., is operating autonomously) and the environment then becomes "unsafe."

In at least some embodiments, remote installation of an operating system, a network of software agents, and additional software, uses standard installation methods supplemented by additional procedures disclosed herein. Standard installation methods for installation of operating system kernels such as are found in Linux® and VxWorks® and supporting file systems are readily available and can be accomplished over the wire, although they are complex. A slightly different approach available in at least some embodiments is to use one or more of an existing kernel and an existing file system already resident or otherwise available on the target platform or media.

Whether an entirely new kernel and file system are installed, or existing file system and kernel are used, the installation can be configured to verify that the kernel and the file system are authentic and genuine. For example, the elements of the target installation can be examined by using procedures to hash appropriate software and to examine hardware elements such as hardware IDs, the bios, and the disk IDs. The installation procedure can be secured further if the installing programs know in advance the correct hashes of one or more of the kernel and the file system and the hardware IDs on the target media. Confirmation of by way of such hash comparisons can provide at least some measure of assurance that the kernel and file system as well as the hardware IDs on the target media have not been tampered with.

If a controlled process is running VxWorks, and the software is written in kernel mode, all software for the controllable platform would be installed according to the system illustrated in FIG. 2A. The consequences are that for installation on a VxWorks target operating in kernel mode, which is commonly used in military applications, installation of the operating system and the file system occurs substantially simultaneously, when the agent network is installed. If a Linux target is part of the system, the kernel, the file system, and other software can be installed in stages.

Referring again to FIG. 2A, a network definition file 232, various functions 238 written by the developers, and the sensitive technologies 240 to be protected are input to the configuration server, e.g., the ANGEL ROC compiler, which then produces the artifacts to be installed as described above.

The network definition file 232 implies that the software agent network 214 to be installed, and the characteristics of the target environment, including the IP addresses, are known in advance, and that the network to be built matches this definition. An option is to build another preliminary agent network to examine the target system 208, 216, to then use the information collected by the software agents to construct the network definition file 232, and then use the network definition file 232 to build the installed agent network 214.

One or more of the software agent network disclosed herein can be implemented in a chained configuration. A chained software agent network includes several software agents collaborating to conduct a common function. While information is traversing the software agents of a chain, the software agents in the chain can be configured to run various functions to examine the system. Examination of the system can include examination of sensory input, process status, and status of one or more of the software agents themselves. In at least some embodiments, chains of software agents are used to generate encryption and/or decryption key material, e.g., resulting from examinations conducted by software agents of the chain. For example, respective fragments of key material determined by each software agent of the chain can be combined to produce a key. If the examinations performed by the software agents fall within a predetermined or otherwise established range, the resulting key can be used decrypt its target object; otherwise, despite the key being generated, the resulting key will not decrypt the target object. The target object can be sensitive technology embedded within an installed artifact or it can be a target object designed to test whether the system is in certain state.

It is understood that multiple chains can be created to perform different cryptographic or examination functions in a cooperative manner in order to obtain a key. Such cooperative approaches can include logical combinations of one or more individual chains, such that a desired result, e.g., generation of a successful key, is obtained only when each of the chains produces a respective result that when combined according to the logic results in the desired result.

Thus, functions can be written by system designer following appropriate format rules or written by programmers to achieve certain objectives. The ranges of successful performance of the functions are specified by the system designers. The functions, the chains, the software agents which composed the chains, and the functions a specific agent executes within a specific chain can all defined or identified by the network definition file 232.

The design of a software agent network can be different for each system and can also depend on one or more of the functionality of the target system or the decisions of the system designer with respect to sensitive technology protection and the functions that the network of software agents is to perform. Using the techniques disclosed herein, it is possible to design a network of software agents that will make the sensitive technology available in an unencrypted fashion only if the system is in a predefined state as pre-chosen by the system designer during a design phase, generally conducted in a secure environment 202.

Using the techniques disclosed herein, it is also possible to continue to examine the control system and to destroy the unprotected instances of the sensitive technology should the system state change from a safe state to an unsafe state.

The procedure described in FIG. 2A for the installation of an angel network can be divided into several phases. In the first phase, the network of software agents can be used to gather information about the target system 200. In a second phase, a version of the network of software agents is run on the target hardware 200' to produce key material assuming the system is running in a safe state. The key thus produced is used to encrypt and/or decrypt the sensitive technology. In a third phase, the encrypted sensitive technology is embedded in a third version of the network of software agents. The third version of the network of software agents is used to protect the controlled process and the controller when they execute the application on the controlled process. Other versions of the network of software agents are destroyed.

Multiple instances of sensitive technology can be protected in this fashion using multiple chains which will produce different keys for each instance. It is also possible to produce functions or code fragments which can be passed from agent to agent so that the function or fragment is sent from one agent and executes on another agent. This technique can be used to examine a target execution environment by running software on the target that has never before appeared on the target. This technique can be used to examine the target during the installation process when the sending agent would be the agent 214*j* on the server 222 (FIG. 2A) or during operation of the system when the sending agent would be the agent 254 on the control station 208 and/or the controllable platform 216. If the controllable platform 216 process loses contact with the control station 208, the same technique can be employed by software agent on the controllable platform 216 or process sending code for execution by different agent on the controlled process.

The network of software agents 214, 254 can conduct examinations of the system state and optionally, at the request of the system designer, can impose a penalty so that the critical technology can never be decrypted. If the change in system state is discovered before an adversary has been able to copy the entire system to a virtualized environment, the penalty can be imposed on cryptographic material that is stored in a non-volatile medium on the system hardware. If the adversary has successfully copied the system to another medium, the penalty can be imposed within the copied artifacts. The penalty should be imposed covertly so that the adversary will not realize that the penalty has been imposed and will continue to experiment with the abstracted system rather than refreshing it. The strategy of always producing a key, even if the key does not correctly decrypt, hides from the adversary whether a penalty has already been imposed and hopefully will require the adversary to engage in months or years of fruitless reverse engineering effort.

The network definition file can be utilized to define blocks of data, such as randomly generated data that are installed into artifacts that make up the network of angels that will run on the target system. These blocks of data can be used to provide session keys that are used for initial communications among the angels and also to produce longer keys that can be used to encrypt communications among the angels. Any of the keys produced according to the techniques disclosed herein could be used to perturb blocks of installed random data so as to produce longer keys to encrypt and decrypt the critical technology.

Figure 3:
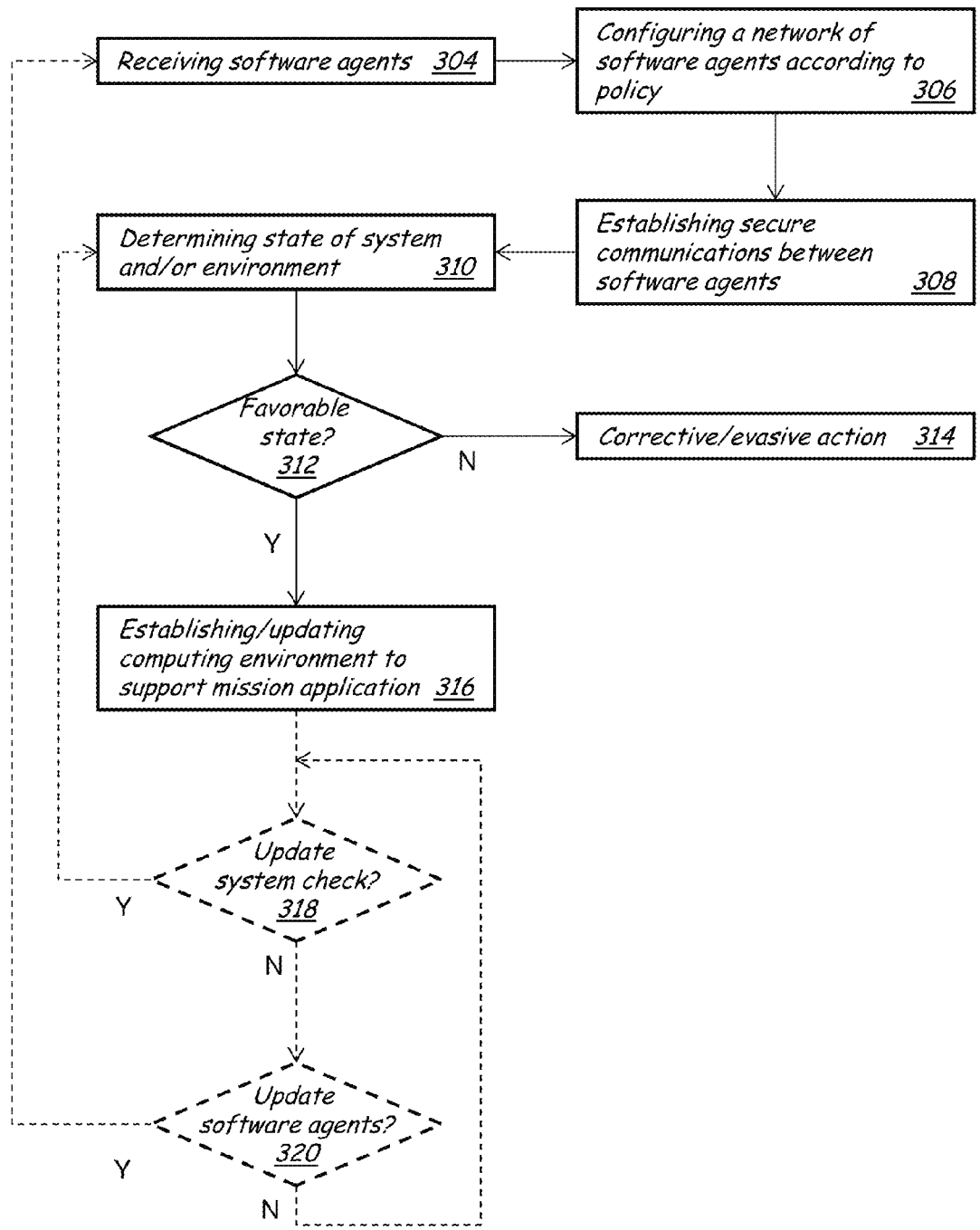
FIG. 3 depicts an illustrative embodiment of a process operating in portions of the system described in FIG. 1, FIG. 2A and FIG. 2B.

FIG. 3 depicts an illustrative embodiment of a process 300 used by one or more of the PCs 210*a*, 210*b* of the control station 208 or the modules or boards 218*a*, 218*b* of the controllable platform 216 or process. One or more software agents 214, 254 are received at 304. A network of the received software agents 214, 254 is configured at 306 according to a policy definition, e.g., one or more of a network definition file 232, an authentication function 234, response functions 236, other functions 238 and sensitive technologies. A state of one or more of the system and/or the environment is determined at 310. To the extent the determined state is not favorable at 312, corrective and/or evasive action can be taken at 314. To the extent the determined state is favorable 312, however, the computing environment can be initialized or otherwise updated to support a mission application at 316.

In at least some embodiments, a determination is made at 318 whether a system update should be determined. In response to concluding that a system update should be determined, the process is directed to 310, in which an updated state of the system and/or environment is determined at 310, and so forth.

Alternatively or in addition, a determination can be made at 320 whether the software agents of the initialized network of software agents should be updated. To the extent that it is determined to update the software agents, the process 300 is directed to 304, in which new and/or updated software agents are received. The process continues from 304 as described above, instead using the new and/or updated software agents.

Figure 4:
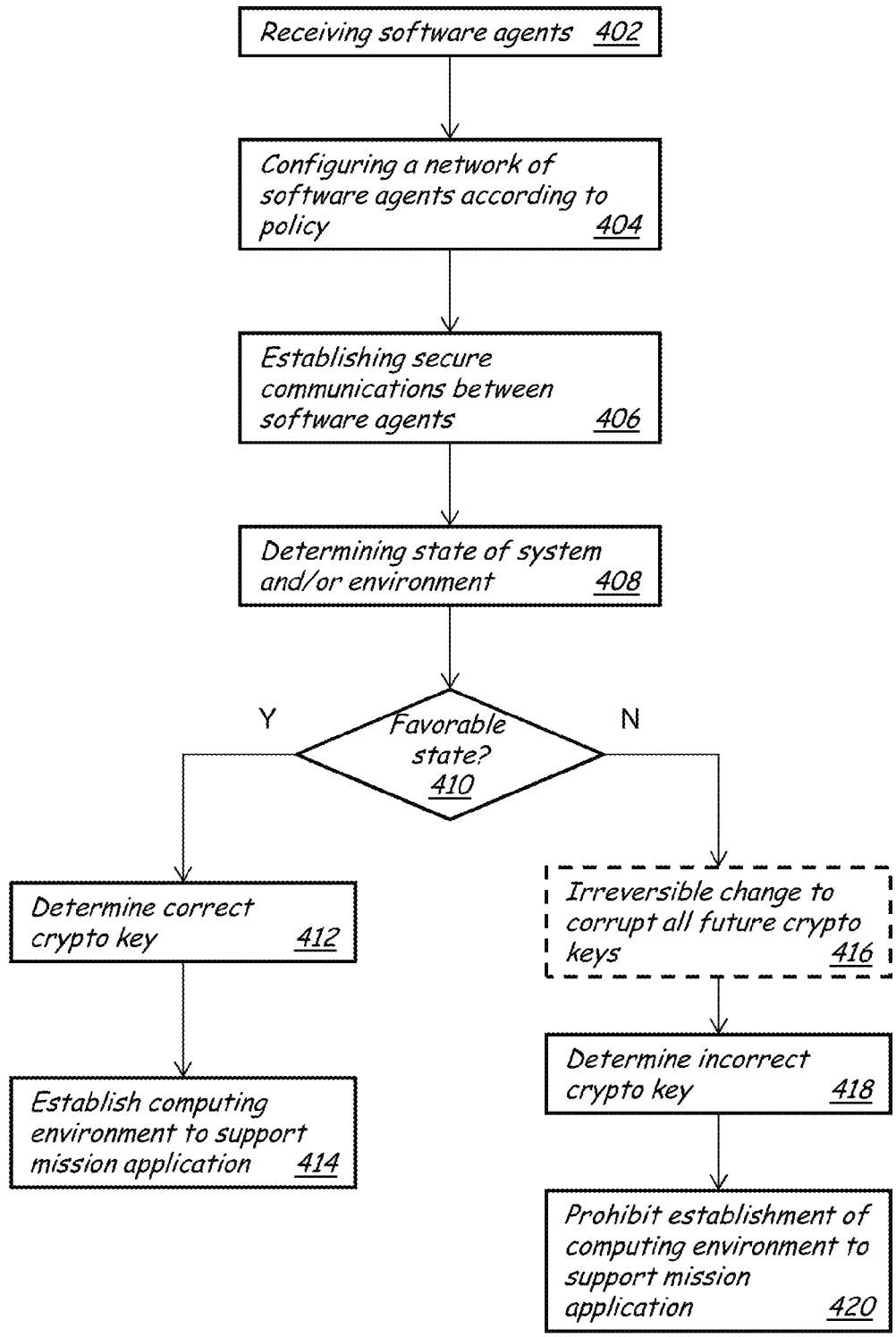
FIG. 4 and FIG. 5 depicts illustrative embodiments of alternative processes operating in portions of the system described in FIG. 1, FIG. 2A and FIG. 2B.

FIG. 4 depicts an illustrative embodiment of an alternative embodiment of a process 400 used by one or more of the PCs 210*a*, 210*b* of the control station 208 or the modules or boards 218*a*, 218*b* of the controllable platform 216 or process. One or more software agents 214, 254 are received at 402. A network of the received software agents 214, 254 is configured at 404 according to a policy definition, e.g., one or more of a network definition file 232, an authentication function 234, response functions 236, other functions 238 and sensitive technologies. Secure communications are initialized between software agents of the network of software agents at 406. A state of one or more of the system and/or the environment is determined at 408. To the extent the determined state is not favorable at 410, an incorrect or otherwise ineffective encryption key can be determined at 418. Such an ineffective encryption key prohibits facilitation at 420 of a computing environment to support mission applications. In some embodiments, an irreversible change can be imposed at 416 (shown in phantom) to ensure that future determination of encryption keys will always result in determination of an incorrect encryption key. To the extent the determined state is favorable at 410, however, the correct or otherwise effective encryption key can be determined at 412. Facilitation of a computing environment to support mission applications can be accomplished at 414.

Figure 5:
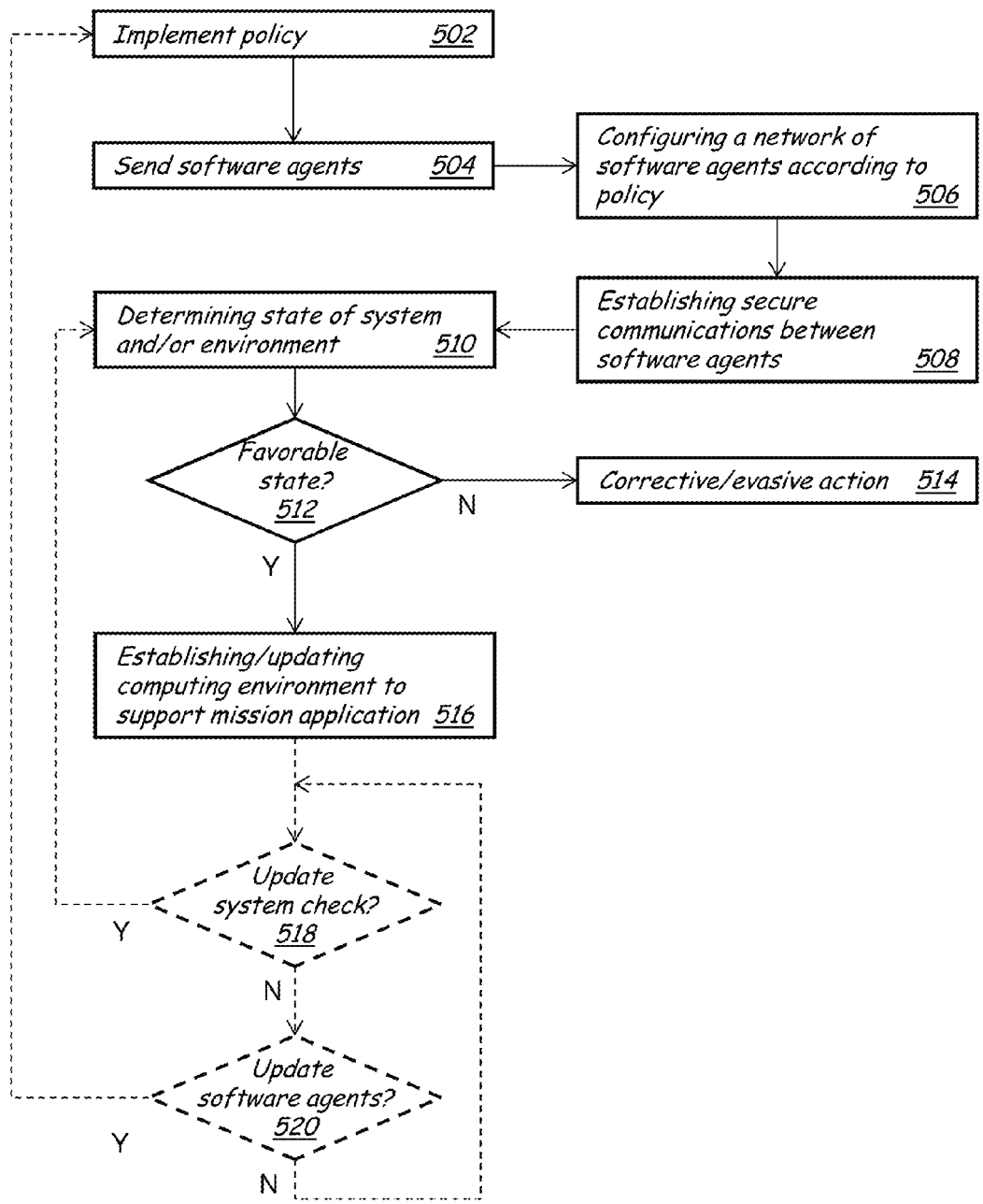

FIG. 5 depicts an illustrative embodiment of a process 500 used by one or more of the configuration server 204 and the server 222. A policy is implemented at 502. One or more software agents 214, 254 are sent to one or more of the control station 208 and the controllable platform at 504. A network of the received software agents 214, 254 is configured at 506 according to a policy definition, e.g., one or more network definition file 232, an authentication function 234, response functions 236, other functions 238 and sensitive technologies. A state of one or more of the system and/or the environment is determined at 510. To the extent the determined state is not favorable at 512, corrective and/or evasive action can be taken at 514. To the extent the determined state is favorable at 512, however, the computing environment can be initialized or otherwise updated to support a mission application at 516.

In at least some embodiments, a determination is made at 518 (shown in phantom) whether a system update should be determined. In response to concluding that a system update should be determined, the process is directed to 510, in which an updated state of the system and/or environment is determined at 510, and so forth.

Alternatively or in addition, a determination can be made at 520 (also shown in phantom) whether the software agents of the initialized network of software agents should be updated. To the extent that it is determined to update the software agents, the process 500 is directed to 502, in which the policy is implemented. The process continues from 502 as described above, instead using the new and/or updated software agents.

Figure 6:
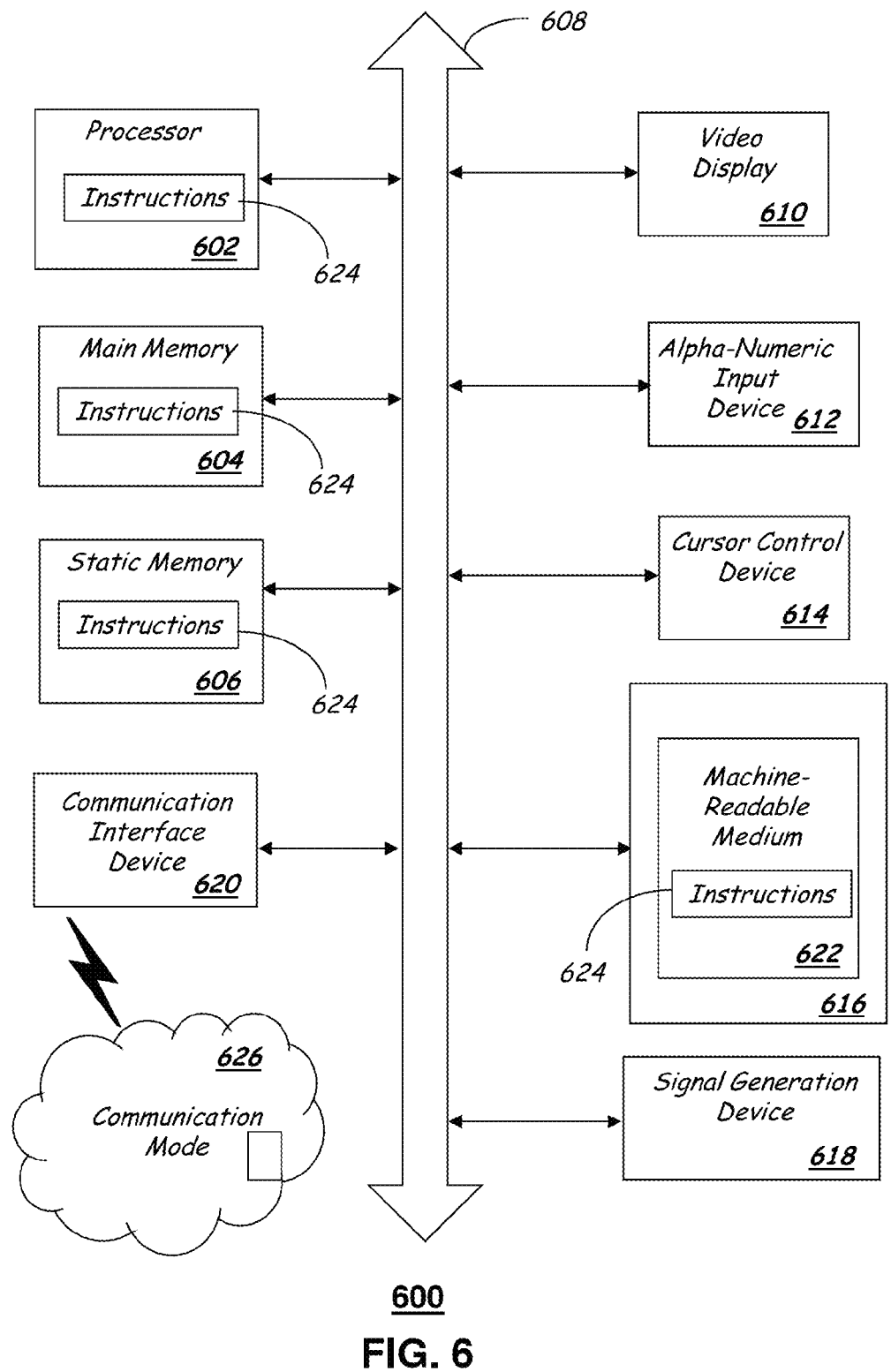
FIG. 6 is a diagrammatic representation of a machine in the form of a computer system within which a set of instructions, when executed, may cause the machine to perform any one or more of the processes described herein.

FIG. 6 depicts an exemplary diagrammatic representation of a machine in the form of a computer system 600 within which a set of instructions, when executed, may cause the machine to perform any one or more of the processes and techniques describe above. One or more instances of the machine can operate, for example, as the configuration server 102, the first and/or second devices 110*a*, 110*b*, the server 222, the configuration server 204, the first and/or second PCs 210*a*, 210*b* of the control station 208 and the first and/or second boards or modules 218*a*, 218*b* of the controllable platform 216. In some embodiments, the machine can be connected (e.g., using a communication mode, such as a control channel 108, e.g., network to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display. The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 may also constitute tangible computer-readable storage media.

There are several exemplary scenarios in which the technology may be implemented. In a first scenario, a wireless device or devices (i.e., "remote nodes") may be attached to or embedded in shipping containers. The remote nodes may couple by wired or wireless means to various detectors configured, for example, to detect weapons of mass destruction. The detectors can be located inside the container and distributed as needed to adequately perform their surveillance functions. The detectors can be packaged with remote nodes or external to the remote nodes. The remote nodes are queried by appropriate external monitor systems to determine if the nodes and detectors have sensed weapons of mass destruction or other contraband. One issue to be confronted in such a scenario is that an enemy might attempt to sabotage or reverse engineer the nodes so that they falsely report a safe status, so that the container would pass query by authorities. This scenario is referred to as the shipping container scenario.

In another scenario, wireless remote nodes may be attached to soldiers so that these nodes can be queried on the battlefield to determine whether a person is friend or foe. One issue here is that an enemy might capture the soldiers or the equipment and reverse engineer the wireless remote node, thereby allowing the enemy to masquerade as a friend. Conversely, friendly forces might mistakenly consider a soldier on the battlefield who cannot be authenticated to be the enemy and open fire. This scenario is referred to as the soldier scenario.

In yet another scenario, wireless remote nodes may be attached to equipment such as tanks or airplanes. In such a case, the remote nodes can be queried on the battlefield to determine whether the vehicle is friend or foe. This scenario is referred to as the vehicle scenario.

In still another scenario, wireless remote nodes may be attached to individuals so that the individuals can gain authorized access to a building or an event. An issue to be confronted is that an enemy may capture an authorized individual, reverse engineer the remote node, and gain unauthorized admission. This scenario is referred to as the pass holder scenario.

In each scenario above, the wireless remote node passes through the following stages:

(1) A secure stage or stages, where the wireless remote node will be securely provided with cryptographic material.
(2) An insecure stage, where the wireless remote node will be subject to attack by an enemy.
(3) A stage where the wireless remote node will be able to detect an attack by an enemy.
(4) A stage where the wireless remote node will be queried by an external responsible agent (e.g., military or civilian authorities).

Provided in accordance with one aspect of the technology, is the ability to detect in stage (4) if an enemy attack has occurred in stage (3). This goal could be achieved by providing in stage (4) a measure of the probability that an attack has or has not occurred in stage (3). An additional goal in the soldier and vehicle scenarios is to positively identify an unknown person or vehicle as friend or foe. Table 1 shows, for each scenario, a set of secure stages and a corresponding set of attack detection approaches, as examples.

TABLE 1

| Scenario | Secure Stages | Attack Detection |
| --- | --- | --- |
| Shipping Container | Manufacturing plant Shipping Line premises US Port US Controlled facilities | Several devices monitor one another inside the same container Several devices monitor one another across different containers Other sensors detect WMD Individual device senses attack against it |
| Soldier | Squad room before mission Presence of other soldiers or equipment during mission | Device attaches to body sensor |
| Military vehicle or airplane | Before takeoff or before mission For vehicle, in presence of other soldiers or equipment | Device attaches to sensors embedded in vehicle. Device attaches to body sensors or devices of occupants |
| Pass holder | From home via telephone. Company facility | Device attaches to body sensor |

Shipping Container Scenario. Each shipping container would contain one or more wireless remote nodes that is configured to communicate internally with one another and externally with other nodes. The remote nodes would include an interface to facilitate coupling to various sensors disposed to detect the presence of illegal conditions within the container. Such detectors could, for example, be embedded in or attached to the container, as could be the remote nodes. In addition to sensing the presence of illegal conditions, the sensors could be configured to detect access to the container, whether authorized or unauthorized. Illegal conditions could be the presence of anyone or more of dangerous chemicals, biological agents or radioactive materials, explosives, drugs, or the like.

The shipping container will at various times be in facilities that are relatively secure, such as the manufacturing plant or a US Port or US controlled facility. At these times, the remote nodes can be securely provided with cryptographic materials via the Secure Network.

The wireless devices would detect an attack when they sensed prohibited substances or when an individual device sensed that it was being attacked. Several remote nodes could also continually monitor one another inside the container. Adjacent containers could also monitor one another.

Soldier Scenario. The soldier will have a wireless device connected to a body sensor. An attack will be sensed when reports from the body sensor indicate that something is amiss or when the body sensor is removed. A soldier can include a soldier, an airman or any person that formally participates in military missions. Prevention of friendly fire instances is an important goal of the soldier wireless device.

The soldier is in a relatively secure environment in the squad room before leaving for a mission and on the battlefield in the visual presence of other soldiers. At these times, the soldier can be provided with cryptographic material using Secure Network methodologies.

Military Vehicle or Airplane Scenario. The number of friendly fire instances in the Iraq war indicates the need for methods of securely identifying unknown vehicles and aircraft.

The technique in the present disclosure involves remotely auditing the remote vehicle by executing code on the remote vehicle that has been introduced over the communication channel just before execution.

This technique also can be applied to remote computing environments that are not located in vehicles.

Figure 7:
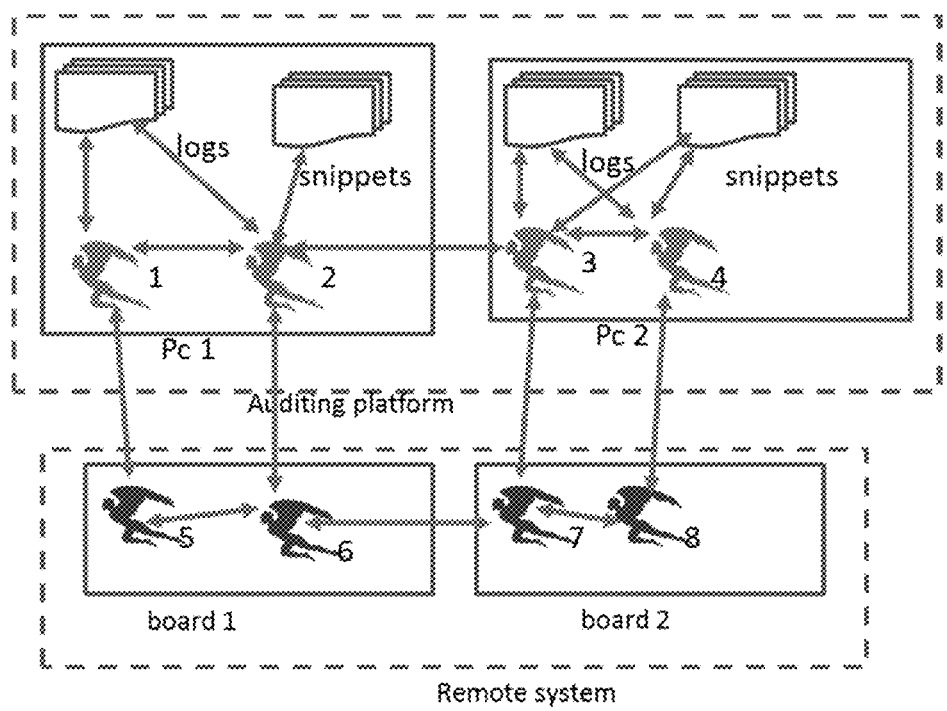
FIG. 7 is a diagrammatic representation of an audit of a remote environment from an auditing platform.

FIG. 7 depicts a generic audit of a remote environment from an auditing platform. Agents are represented by the angel icon are already installed when the secure audit begins. From the auditing platform, code snippets are sent over the communications channel to the remote environment, are executed on the remote environment The process that manages a node can do other things. For example, database servers can be nodes. A process that runs a browser can be a node. Intermediary routers that are used in a massive Secure Network can be nodes, including a massively scalable secure network, e.g., having 27 different nodes, with each node having a different number.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

References to comprise, include, and/or plural forms of each are open ended and include the listed parts and can include additional parts that are not listed. References to and/or are open ended and include one or more of the listed parts and combinations of the listed parts.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 622 is shown in an example embodiment to be a single medium, the term "tangible computer-readable storage medium" should be taken to include a single medium, or multiple media (e.g., a centralized or distributed database, and/or associated caches and servers) that store the one or more sets of instructions. The term "tangible computer-readable storage medium" shall also be taken to include any non-transitory medium including a device that is capable of storing or encoding a set of instructions for execution by the machine and that cause the machine to perform any one or more of the methods of the subject disclosure.

The term "tangible computer-readable storage medium" shall accordingly be taken to include, but not be limited to devices, such as: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for securely producing a cryptographic session key, comprising:

establishing, by a transportable device comprising at least one processor and a plurality of sensors, a software agent network comprising a plurality of software agents networked together in a predetermined configuration according to a network definition file, wherein the transportable device, when deployed in a predetermined environment, contains encrypted sensitive information;

obtaining, by the transportable device, a plurality of examination results based on sensory information obtained from the plurality of sensors operating within the predetermined environment when deployed therein, wherein the sensory information comprises a combination of more than one of temperature, humidity, light, position, orientation, altitude, motion, speed, acceleration, biological information, and mission status, and wherein each software agent of the plurality of software agents conducts a review of a respective examination result of the plurality of examination results of the predetermined environment based on a plurality of predetermined sensory ranges, to obtain reviews of the plurality of examination results of the predetermined environment;

generating, by the transportable device, a plurality of encryption key fragments in response to the reviews of the plurality of examination results of the predetermined environment, wherein each encryption key fragment of the plurality of encryption key fragments is determined by a respective software agent of the plurality of software agents, based on the review of the respective examination result of the plurality of examination results of the predetermined environment;

combining, by the transportable device, the plurality of encryption key fragments based on the network definition file, to obtain a field-determined cryptographic session key;

responsive to the plurality of examination results of the predetermined environment falling within the plurality of sensory ranges, decrypting, by the transportable device, the encrypted sensitive information by way of the field-determined session key, to obtain a clear text version of the sensitive information at the transportable device; and responsive to at least one of the plurality of examination results of the predetermined environment falling outside of the plurality of sensory ranges, preventing, by the transportable device, decryption of the encrypted sensitive information at the transportable device.

2. A deployable system, comprising:

a plurality of sensors;

a memory to store instructions; and at least one processor in communication with the memory, wherein the at least one processor, responsive to executing the instructions, performs operations that securely produce a session key, comprising:

configuring a software agent network comprising a plurality of software agents based on a network definition file, wherein the deployable system, when deployed in a predetermined environment, contains encrypted sensitive information;

obtaining sensory information from the plurality of sensors operating within the predetermined environment when deployed therein, wherein the sensory information comprises a combination of more than one of temperature, humidity, light, position, orientation, altitude, motion, speed, acceleration, biological information, and mission status;

conducting a plurality of examinations of the predetermined environment when deployed therein based on the sensory information, to obtain a plurality of examination results, wherein each software agent of the plurality of software agents conducts a review of a respective examination result of the plurality of examination results of the predetermined environment based on a respective range of a plurality of sensory ranges, to obtain reviews of the plurality of examination results;

generating a plurality of encryption key fragments in response to the reviews of the plurality of examination results of the predetermined environment, wherein each encryption key fragment of the plurality of encryption key fragments is determined by a respective software agent of the plurality of software agents, based on the review of the respective examination result of the plurality of examination results of the predetermined environment;

assembling the plurality of encryption key fragments, to obtain a field-determined cryptographic session key;

responsive to the plurality of examination results of the predetermined environment falling within the plurality of sensory ranges, decrypting the encrypted sensitive information by way of the field-determined cryptographic session key, to obtain a clear text version of the sensitive information; and responsive to at least one of the plurality of examination results of the predetermined environment falling outside of the plurality of sensory ranges, preventing decryption of the encrypted sensitive information.

3. A machine readable storage device, comprising executable instructions that when executed by at least one processor of a deployable asset comprising a plurality of sensors, cause the at least one processor to facilitate operations that securely produce session key comprising:

configuring a software agent network comprising a plurality of software agents, wherein the deployable asset, when deployed in a field environment, contains encrypted sensitive information;

obtaining sensory information from the plurality of sensors operating within the field environment when deployed therein, wherein the sensory information comprises a combination of more than one of temperature, humidity, light, position, orientation, altitude, motion, speed, acceleration, biological information, and mission status;

performing a plurality of examinations of the field environment when deployed therein based on the sensory information, to obtain a plurality of examination results, wherein each software agent of the plurality of software agents conducts a review of a respective examination result of the plurality of examination results of the field environment based on a respective range of a plurality of sensory ranges, to obtain reviews of the plurality of examination results;

generating a plurality of encryption key fragments in response to the reviews of the plurality of examination results of the field environment, wherein each encryption key fragment of the plurality of encryption key fragments is determined by a respective software agent of the plurality of software agents, based on the review of the respective examination result of the plurality of examination results of the field environment;

combining the plurality of encryption key fragments, to obtain a field-determined session key;

responsive to the plurality of examination results of the field environment falling within the plurality of sensory ranges, decrypting, by the deployable asset, the encrypted sensitive information by way of the field-determined session key, to obtain a clear text version of the sensitive information at the deployable asset and within the field environment; and responsive to at least one of the plurality of examination results of the field environment falling outside of the plurality of sensory ranges, preventing decryption of the encrypted sensitive information.

4. The method of claim 1, wherein the encrypted sensitive information is decrypted by way of the field-determined cryptographic session key, responsive to the field-determined cryptographic session key being identical to a symmetric encryption key used to obtain the encrypted sensitive information prior to exposure of the transportable device to the predetermined environment, wherein no key exists at the transportable device to decrypt the encrypted sensitive information until the field-determined cryptographic session key is obtained.

5. The method of claim 4, wherein the plurality of software agents, executing on more than one of the at least one processors, return the plurality of examination results of the predetermined environment, and wherein the field-determined cryptographic session key differs from the symmetric encryption key, responsive to an examination result of the plurality of examination results falling within a predetermined unacceptable range.

6. The method of claim 5, wherein the symmetric encryption key is determined before the transportable device is deployed to the predetermined environment, wherein the symmetric key is used to encrypt the sensitive information is determined before the transportable device is deployed to the predetermined environment, and wherein the encrypted sensitive information is transferred to the transportable device before the transportable device is deployed to the predetermined environment.

7. The method of claim 4, wherein the plurality of software agents return the reviews of the plurality of examination results of the predetermined environment, and wherein the field-determined cryptographic session key matches the symmetric encryption key based on each examination result of the plurality of examination results of the predetermined environment falling within a predetermined acceptable range.

8. The method of claim 7, wherein the symmetric encryption key is determined based on a plurality of examinations of a secure environment, wherein the plurality of examinations of the secure environment produce a plurality of examination results that fall within a plurality of predetermined acceptable ranges.

9. The method of claim 8, responsive to the predetermined acceptable ranges of the predetermined environment not being available within the secure the environment, applying software functions within the secure environment that produce a correct symmetric encryption key expected in the predetermined environment.

10. The method of claim 1, wherein the sensory information comprises a status of a process executing on the processor of the transportable device, a status of at least one software agent of the plurality of software agents, and a combination thereof.

11. The method of claim 1, wherein the transportable device comprises one of a shipping container, equipment of a soldier, a vehicle, a piloted airplane, a drone, an ordinance, and equipment of a pass holder.

12. The deployable system of claim 2, wherein the encrypted sensitive information is decrypted by way of the field-determined cryptographic session key, responsive to the field-determined cryptographic session key being equivalent to a symmetric encryption key used to obtain the encrypted sensitive information, wherein no key exists at the deployable system to decrypt the encrypted sensitive information until the field-determined cryptographic session key is obtained.

13. The deployable system of claim 12, wherein the plurality of software agents, running on more than one of the at least one processor, return the plurality of examination results of the predetermined environment, and wherein the field-determined cryptographic session key fails to match the symmetric encryption key based on an examination result of the plurality of examination results falling within a predetermined unacceptable range.

14. The deployable system of claim 13, wherein the symmetric encryption key is determined before the deployable system is deployed to the predetermined environment, wherein the symmetric key is used to encrypt the sensitive information before the deployable system is deployed to the predetermined environment, and wherein the encrypted sensitive information is transferred to the deployable system before the deployable system is deployed to the predetermined environment.

15. The machine readable storage device of claim 3, wherein the encrypted sensitive information is decrypted by way of the field-determined session key, responsive to the field-determined session key matching a previously determined symmetric encryption key used to obtain the encrypted sensitive information, and wherein the previously determined symmetric encryption key is unavailable on the deployed asset, and wherein the field-determined session key, as a combination of the plurality of encryption key fragments, is only obtainable by way of the plurality of examinations of the field environment.

16. The machine readable storage device of claim 15, wherein the plurality of software agents return the reviews of the plurality of examination results of the field environment, and wherein the field-determined session key matches the symmetric encryption key based on each examination result of the plurality of examination results falling within a predetermined acceptable range.

17. The machine readable storage device of claim 16, wherein the symmetric encryption key is determined based on a plurality of examinations of a secure environment, wherein the plurality of examinations of the secure environment produce a plurality of examination results that fall within a plurality of predetermined acceptable ranges.

18. The machine readable storage device of claim 17 responsive to the predetermined acceptable ranges of the field environment not being available within the secure the environment, applying software functions within the secure environment that produce a correct symmetric encryption key expected in the field environment.

* * * * *